United States Patent [19]
Johnson

[11] Patent Number: 5,392,496
[45] Date of Patent: Feb. 28, 1995

[54] CABLE CLAMP

[75] Inventor: Emeric W. Johnson, Salmon Arm, Canada

[73] Assignee: Newnes Machine Ltd., Salmon Arm, Canada

[21] Appl. No.: 62,432

[22] Filed: May 13, 1993

[51] Int. Cl.⁶ .................... A44B 21/00; H02G 7/00
[52] U.S. Cl. .................. 24/136 R; 24/115 M; 24/136 B
[58] Field of Search ............ 24/136 R, 136 B, 115 M, 24/503; 254/264; 403/374; 188/65.1

[56] References Cited

U.S. PATENT DOCUMENTS

| | | | |
|---|---|---|---|
| 749,896 | 1/1904 | Brown | 24/136 R |
| 875,121 | 12/1907 | Shryock | 24/136 R |
| 944,141 | 12/1909 | Mounts | 24/136 R |
| 1,478,950 | 12/1923 | Gilliam | 24/136 R |
| 4,569,507 | 2/1986 | Robert | 24/136 R |
| 4,874,152 | 10/1989 | Roberts et al. | |
| 5,015,023 | 5/1991 | Hall | 24/136 R |
| 5,119,529 | 6/1992 | Kaye | 24/136 R |

FOREIGN PATENT DOCUMENTS

| | | | |
|---|---|---|---|
| 2498833 | 7/1982 | France | 24/136 R |

*Primary Examiner*—Victor N. Sakran
*Attorney, Agent, or Firm*—Oyen Wiggs Green & Mutala

[57] ABSTRACT

A cable clamping mechanism (10) having first and second jaws (24, 26) for clamping a cable (12). First and second backstops (20, 22) are fixed to a top plate (18) on opposite sides of the jaws. A first wedge (52) is slidably mounted between the jaws and the second backstop. A second wedge (56) is slidably mounted between the top plate and the first wedge. A hydraulic cylinder (60) slidably forces the second wedge across the first wedge, thereby forcing the first wedge against the jaws to clamp the cable therebetween.

13 Claims, 4 Drawing Sheets

CABLE CLAMP

FIELD OF THE INVENTION

This application pertains to a mechanism for clamping a cable to prevent longitudinal displacement of the cable until the mechanism is disengaged.

BACKGROUND OF THE INVENTION

There are many situations in which a cable must be clamped to prevent longitudinal displacement of the cable. For example, winch-driven cables are used to haul logs in the logging industry. It is often necessary to temporarily clamp the cable to prevent it from moving along its longitudinal axis while logs are attached to one end of the cable or removed therefrom. In the marine industry, tug boats use cables as tow lines for hauling barges and the like. While a barge is under tow, the tow line must be clamped to prevent intermittent forces from being transmitted along the cable to the tug boat's cable winching apparatus. In various other industries, support platforms are raised or lowered on cables which must sometimes be rapidly and reliably clamped to prevent movement of the cables or platform; for example to ensure the safety of men working beneath the platform.

The prior art has evolved a variety of cable clamping mechanisms. For example, U.S. Pat. No. 4,874,152 issued Oct. 17, 1989 discloses a cable gripping block for suspension bridge cables and the like in which a pair of cable clamping blocks are disposed in a wedge configuration to clamp a cable and prevent it from moving longitudinally. The cable is released by pulling it longitudinally away from the narrow end of the wedge configuration. In the present invention, the cable is released by moving one of a pair of wedges, which together force the cable clamping jaws against the cable.

SUMMARY OF THE INVENTION

In accordance with the preferred embodiment, the invention provides a cable clamp having first and second jaws for clamping a cable. A pair of jaw backstops depend downwardly from a top plate, on opposite sides of the jaws. A first wedge is slidably mounted between the jaws and the second backstop; and, a second wedge is slidably mounted between the top plate and the first wedge. Motor means such as a hydraulic cylinder forces the second wedge across the first wedge, thereby forcing the first wedge downwardly and against the jaws to clamp the cable therebetween.

The jaws have a wedge shape, defined by their inclined outer surfaces. The first jaw slides across the first backstop along a surface inclined at the same angle as the first jaw's outer surface. The second jaw slides across the first wedge along a surface inclined at the same angle as the second jaw's outer surface. The second backstop has an inner surface inclined away from the jaws to define an acute angle between the surfaces.

The second wedge slides across a surface of first wedge inclined downwardly and away from the jaws. The angle of inclination of this surface, relative to the second wedge, serves to self-lock the two wedges. That is, when the second wedge is driven across the surface in one direction, it is inhibited from slipping across the surface in the opposite direction.

A latch mechanism is provided as a safeguard against failure of the self-locking feature aforesaid. A latch release mechanism is also provided for controllably releasing the latch pin when the second wedge is to be withdrawn to release the cable.

DETAILED DESCRIPTION OF THE PREFERRED EMBODIMENT

Figure 4:
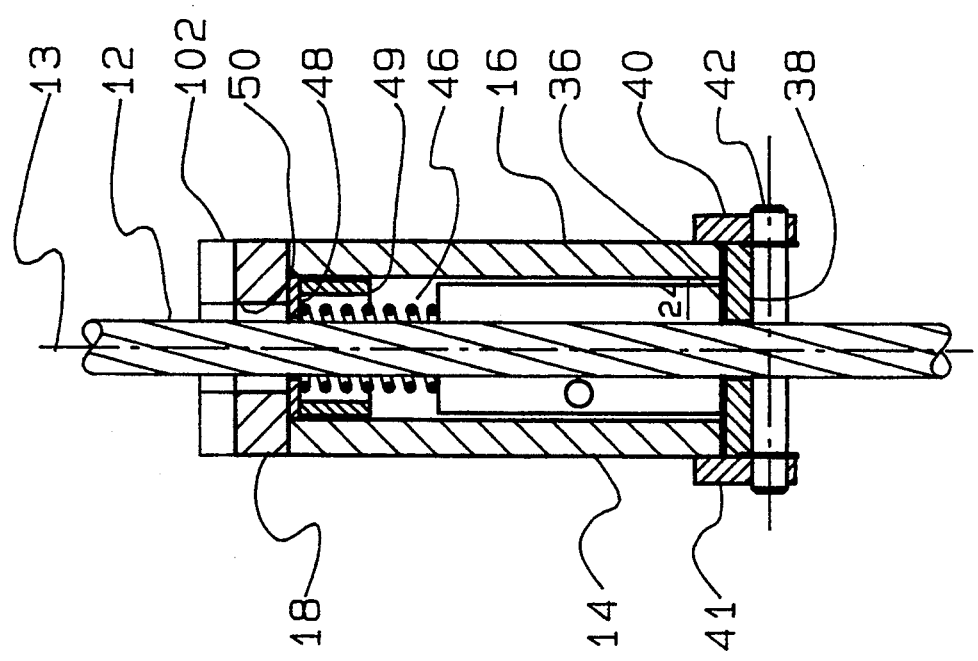
FIG. 4 is a cross-sectional side elevation view taken with respect to line 4—4 of FIG. 1, showing the cable clamp's front plate in place.

The drawings depict a cable clamping mechanism 10 for clamping a cable 12 to prevent longitudinal displacement of cable 12 along axis 13. A pair of spaced front and rear plates 14, 16 (FIG. 4) are welded to top plate 18 and extend downwardly therefrom. The outward faces of a pair of jaw backstops 20, 22 are welded to the inner faces of plates 14, 16 respectively. A pair of wedge-shaped cable-clamping jaws 24, 26 are disposed on opposite sides of cable 12. Semi-cylindrical grooves 28, 30 in the opposed, inward faces of jaws 24, 26 define a cylindrical aperture for longitudinal movement of cable 12 when jaws 24, 26 are released as hereinafter explained. The inward surfaces 32, 34 of jaw backstops 20, 22 may be coated with DYNA SURF ™ or other suitable material to prevent rusting and reduce frictional contact between surfaces 32, 34 and other parts of clamping mechanism 10. Anti-friction plates 31, 33 made of GARLOC ™ or other suitable anti-friction material are screwed to the outward faces of jaws 24, 26.

Jaws 24, 26 are retained within clamping mechanism 10 by pins 42, 44 which support plates 36, 38. Pins 42, 44 are in turn supported by plates 40, 41 (FIG. 4) which are welded to plates 16, 14 respectively. Cable 12 passes through apertures in plates 36, 38. Plate 36 acts as a dust cover. Plate 38 "floats" atop pins 42, 44. The diameter of the aperture in plate 38 is only slightly larger than the diameter of cable 12, thus allowing plate 38 to wipe foreign matter off cable 12 as it moves along axis 13 relative to plate 38. Because plate 38 is not fixed in place it can move from side to side to accommodate corresponding movement of cable 12, within the limits imposed by the diameter of the aperture in plate 36.

Spring 46 is compressed between the tops of jaws 24, 26 and stop plate 48. Housing 49 is fixed to and protrudes downwardly from stop plate 48, encircling spring 46 and limiting upward movement of jaws 24, 26 as hereinafter explained. Spring 46 forces stop plate 48 upwardly against the underside of top plate 18 and tends to force jaws 24, 26 downwardly. Because plate 48 is not fixed in place it can move from side to side to accommodate corresponding movement of cable 12.

The upper end of jaw backstop 20 is inwardly inclined at a slight angle off the vertical; and, the upper end of backstop 22 is outwardly inclined at a larger angle. A first wedge 52 is slidably mounted against backstop 22 such that inwardly inclined face 54 of wedge 52 contacts the outwardly inclined face of jaw 26 (or, more particularly, contacts anti-friction plate 33 fixed to the outward face of jaw 26). A second wedge 56 is positioned between the inclined top surface 58 of first wedge 52 and the underside of top plate 18. A suitable "motor means" such as hydraulic cylinder 60 is mounted on end plate 62 which is fastened by bolts 64, 66 to blocks 68, 70 which are in turn welded to top plate 18 and rear plate 16 respectively. The end of cylinder rod 72 projects from hydraulic cylinder 60 and is threaded into one side of tapered nut 74, which fits within a mating recess 76 provided in the end of wedge 56. The opposite side of nut 74 threadably receives one end of bolt 78 which slides freely within a cylindrical aperture through wedge 56, terminating in bolt head 80.

Latch pin 82 protrudes downwardly through aperture 84 in top plate 18. Aperture 84 may be lined with GARLOC ™ or other suitable anti-friction material to prevent binding of pin 82 within aperture 84. Spring 86 is compressed between the underside of housing 88 and the top of latch pin 82, thereby forcing latch pin 82 downwardly toward cylinder rod 72. Housing 88 is threaded onto collar 89, which is welded to top plate 18.

At the underside of clamping mechanism 10, bolt 90 passes through guide plate 92 (which is in turn fastened to jaw backstop 22 by bolt 93) and is threadably fastened within wedge 52. Spring 94 encircles the shaft of bolt 90 and is compressed between the inward surface of plate 36 and wedge 52, thereby tending to force wedge 52 upwardly. As wedge 52 moves back and forth across backstop 22 as hereinafter explained, bolt 90 is drawn back and forth through plate 92. This serves to hold wedge 52 in place relative to backstop 22.

Figure 1:
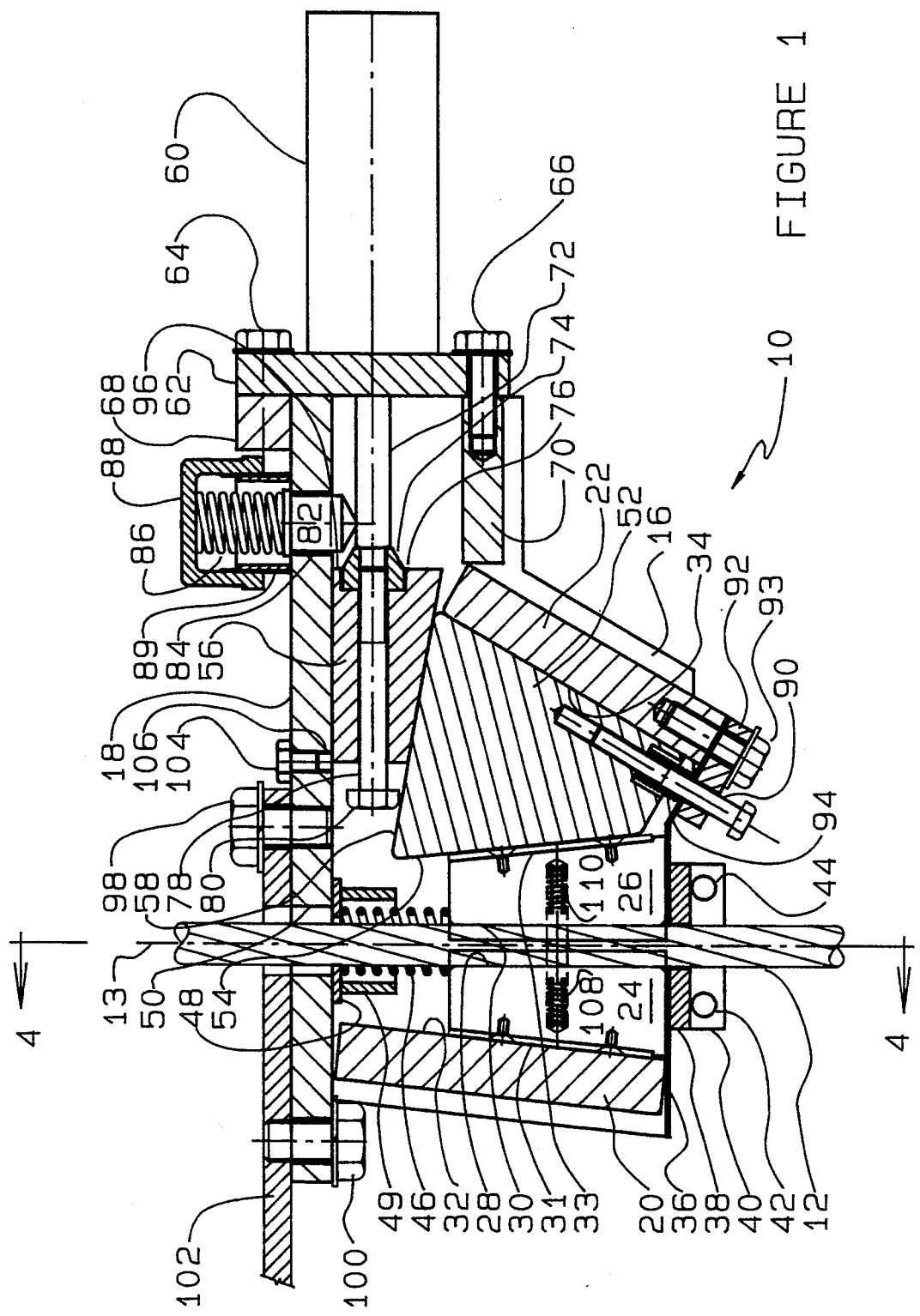
FIG. 1 is a cross-sectional front elevation view of a cable clamp constructed in accordance with the preferred embodiment of the invention, showing the jaws in the clamped position. The cable clamp's front plate is removed for clarity of illustration.

Clamping mechanism 10 can be supported in a variety of ways, including fastening it by bolts 98, 100 to a convenient mounting plate 102. Bolt 104 can be removed to inspect the position of wedge 56 through aperture 106 in top plate 18; or, to inspect the position of bolt head 80 and thereby determine whether clamping mechanism 10 is engaged (FIG. 1: note bolt head 80 extended to the left and visible through aperture 106) or dis-engaged (FIG. 3: note bolt head 80 retracted to the right and not visible through aperture 106).

In operation, cable 12 is clamped by hydraulically actuating cylinder 60 to extend rod 72 to the left. This forces nut 74 into recess 76, driving wedge 56 to the left. As wedge 56 moves to the left its inclined lower surface slides across inclined upper surface 58 of wedge 52, forcing wedge 52 to slide downwardly against inward surface 34 of backstop 22. As wedge 52 moves down, its inwardly inclined face 54 slides across outwardly inclined anti-friction plate 33 fixed to jaw 26, forcing jaw 26 down and to the left (i.e. against jaw 24). Backstop 20 resists leftward or upward movement of jaw 24. Because plates 31, 33 slide freely relative to surfaces 32, 54 cable 12 is initially frictionally gripped between jaws 24, 26 and then securely clamped between the jaws as further leftward movement of rod 72 increases the clamping force imparted to jaws 24, 26 by wedges 52, 56.

Any upward movement of cable 12 tends to draw jaws 24, 26 upwardly, due to the frictional gripping characteristic aforesaid. If jaws 24, 26 move up, inclined anti-friction plate 31 slides across inwardly inclined face 32 of backstop 20; and, plate 33 slides across inwardly inclined face 54 of wedge 52, increasing the leftward force applied to jaws 24, 26 by wedge 52. Jaws 24, 26 are thus further compressed between wedge 52 and backstop 20, increasing the clamping force applied to cable 12.

The lower surface of wedge 56 is inclined at an angle which facilitates self-locking of wedge 56 relative to wedge 52. That is, once wedge 56 is driven to the left as described above, it will not slide to the right unless subjected to an oppositely directed force, as described below. The self-locking angle is determined by the materials used. In general, if the material's coefficient of friction exceeds the tangent of the angle subtended by the upper and lower surfaces of wedge 56 the angle is self-locking (assuming ideal smooth surfaces). In the preferred embodiment wedge 56 is made of Naval bronze #C-954, for which the self-locking angle was determined to be 10°.

The self-locking feature aforesaid may be defeated in certain circumstances. For example, the slidably opposed surfaces between wedges 52, 56 may become contaminated by lubricants; or, clamping mechanism 10 may be subjected to harmonic vibrations, etc.

To safeguard against unexpected defeat of the self-locking feature, latch pin 82 is driven downwardly by spring 86 once rod 72 moves sufficiently far to the left to carry nut 74 clear of latch pin 82. If wedge 56 is now unexpectedly displaced to the right, nut 74 remains seated within recess 76 and lip 96 on wedge 56 butts against the shaft of latch pin 82, preventing wedge 56 from moving further to the right.

Figure 2:
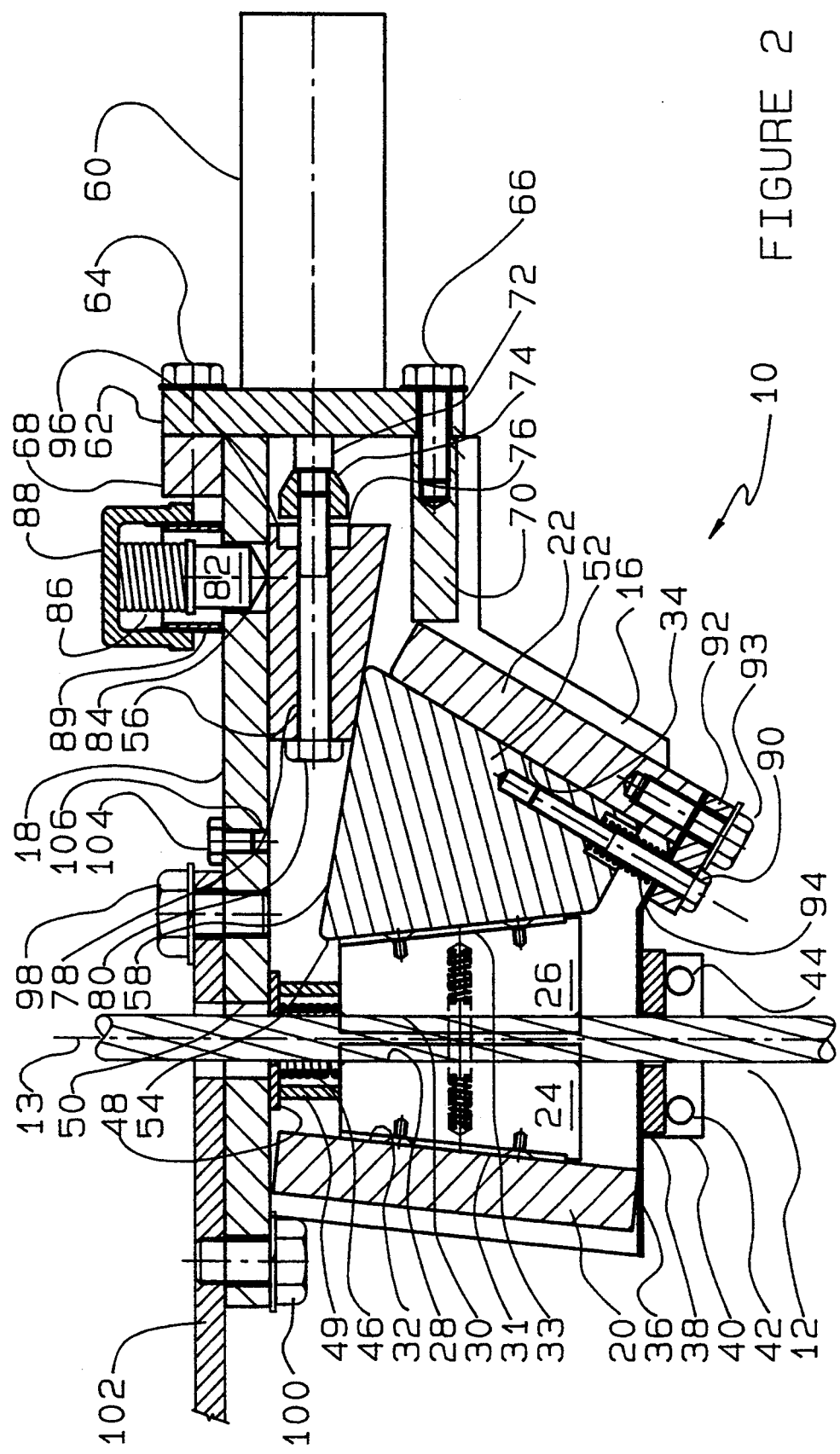
FIG. 2 is similar to FIG. 1, but shows the jaws positioned just prior to release of the cable.

If hydraulic cylinder 60 is intentionally actuated to retract rod 72 to the right, then nut 74 is withdrawn from recess 76 and engages the tapered lower end of latch pin 82. As rod 72 retracts to the right, the tapered portion of nut 74 slides against the tapered lower end of latch pin 82, pushing latch pin 82 upwardly and clear of nut 74. This in turn allows further retraction of rod 72 to the right, thus drawing bolt 78 through wedge 56 until bolt head 80 contacts the left end of wedge 56, forcing wedge 56 to the right as shown in FIG. 2.

Figure 3:
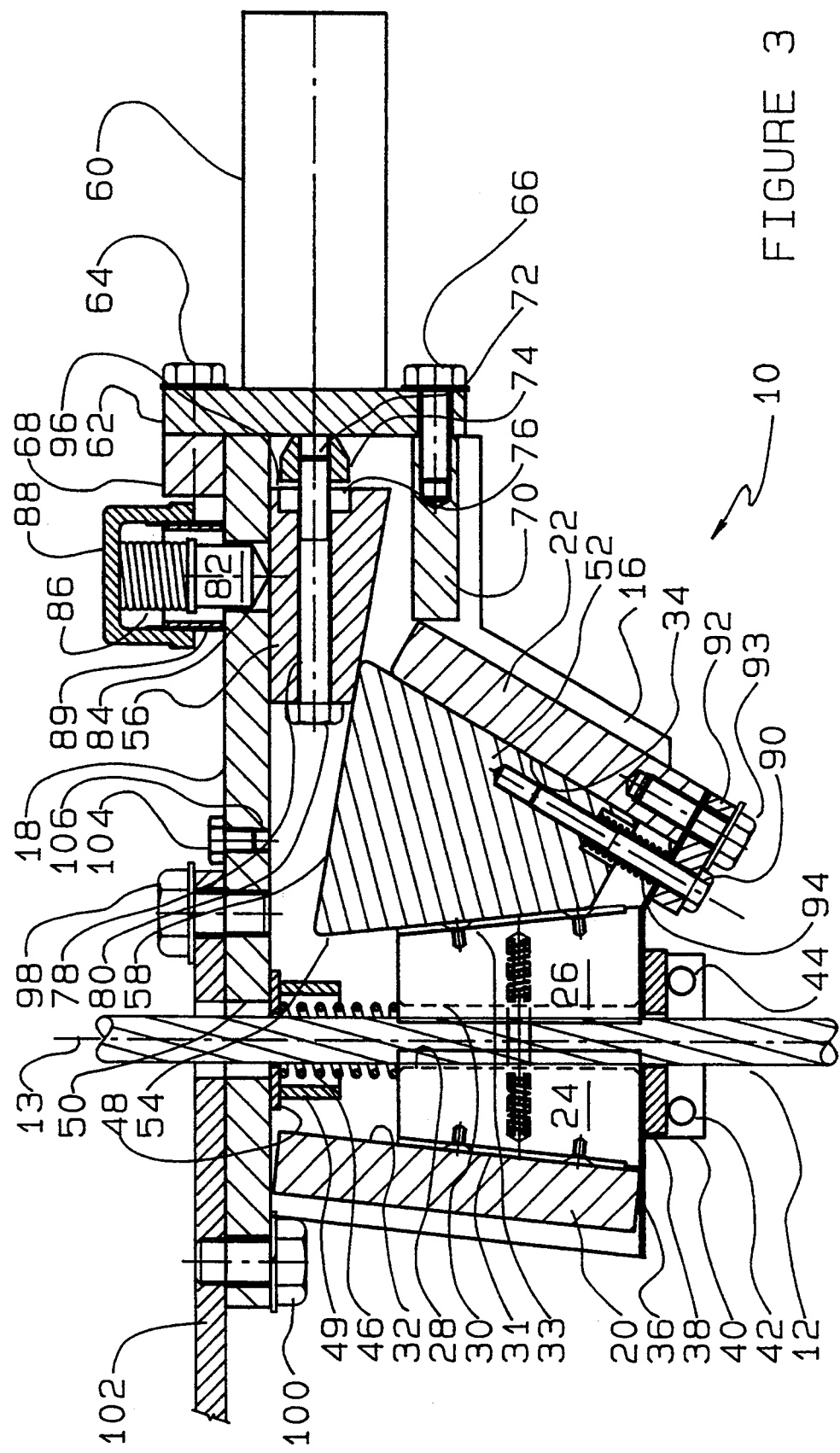
FIG. 3 is similar to FIG. 1, but shows the jaws in the released position.

Retraction of wedge 56 to the right allows spring 94 to push wedge 52 up across surface 34. This in turn allows jaws 24, 26 to be drawn upwardly by cable 12 (due to the frictional gripping characteristic aforesaid) until they strike the base of housing 49 as shown in FIG. 2. Housing 49 prevents further upward movement of the jaws and serves to dislodge them from cable 12 (i.e. the frictional gripping aforesaid is overcome when the jaws strike housing 49), allowing the jaws to drop back down onto plate 36, as shown in FIG. 3. Cable 12 is released at this point. Springs 108, 110 may optionally be provided within jaws 24, 26 to hold the jaws apart when cable 12 is released, thus preventing the jaws from rubbing against the cable as it moves along axis 13.

As will be apparent to those skilled in the art in the light of the foregoing disclosure, many alterations and modifications are possible in the practice of this invention without departing from the spirit or scope thereof. For example, hydraulic cylinder 60 could be replaced by an equivalent motor means such as a screw activator or a slide hammer. Moreover, cable 12 need not be a wire rope; it could be a hemp rope, solid steel rod, extended flat plate, etc. Accordingly, the scope of the invention is to be construed in accordance with the substance defined by the following claims.

What is claimed is:

1. A cable clamp (10) having first and second jaws (24, 26) disposed on opposite sides of and for clamping a cable (12), characterized by:

(a) a top plate (18);

(b) first and second backstops (20, 22) fixed to said top plate on opposite sides of said jaws;

(c) a first wedge (52) slidably mounted between said jaws and said second backstop;
(d) a second wedge (56) slidably mounted between said top plate and said first wedge;
(e) motor means (60) for slidably forcing said second wedge across said first wedge, thereby forcing said first wedge against said jaws to clamp said cable therebetween.

2. A cable clamp as defined in claim 1, wherein said jaws are wedge-shaped.

3. A cable clamp as defined in claim 2, wherein said jaw wedge shapes are defined by inclined outer surfaces (31, 33) on said jaws.

4. A cable clamp as defined in claim 3, wherein:
(a) said first jaw slides across said first backstop along a surface (32) inclined at the same angle as said first jaw outer surface; and,
(b) said second jaw slides across said first wedge along a surface (54) inclined at the same angle as said second jaw outer surface.

5. A cable clamp as defined in claim 4, wherein said second backstop has an inner surface (34) inclined away from said jaws to define an acute angle between said surfaces (33, 34).

6. A cable clamp as defined in claim 5, wherein said second wedge slides across a surface (58) of first wedge inclined downwardly and away from said jaws.

7. A cable clamp as defined in claim 6, wherein the angle of inclination of said surface (58) relative to said second wedge is such that movement of said second wedge across said surface (58) in one direction inhibits slippage of said second wedge across said surface (58) in the opposite direction.

8. A cable clamp as defined in claim 7, further comprising latch means for further preventing said slippage of said second wedge across said surface (58).

9. A cable clamp as defined in claim 8, wherein said latch means comprises:

(a) a latch pin (82) mounted for retractable protrusion through said top plate, adjacent said second wedge; and,
(b) a spring (86) for urging said latch pin downwardly after said motor means has slidably forced said second wedge across said first wedge.

10. A cable clamp as defined in claim 9, further comprising latch release means for controllably releasing said latch pin when said motor means is actuated to slidably retract said second wedge across said first wedge to release said cable.

11. A cable clamp as defined in claim 10, wherein said latch release means comprises:
(a) a tapered nut (74) having one side threaded onto a rod (72) of said motor means;
(b) a recess (76) within said second wedge for receiving said tapered nut;
(c) a bolt (78) having one end threaded into the opposite side of said tapered nut, said bolt passing through said second wedge and having a head (80) on its opposite end; and,
(d) a lip (96) above said recess for contacting said latch pin upon said slippage of said second wedge across said surface (58);
whereby slidable retraction of said rod withdraws said nut from said recess to contact said latch pin thereby lifting said latch pin away from said second wedge allowing further retraction of said rod and withdrawal of said bolt through said second wedge bringing said bolt head into contact with said second wedge to drive said second wedge away from said first wedge.

12. A cable clamp as defined in claim 11, further comprising a spring (94) for urging said first wedge away from said jaws.

13. A cable clamp as defined in claim 12, further comprising a spring (46) for urging said jaws away from said top plate.

* * * * *